(12) United States Patent
Li et al.

(10) Patent No.: US 11,442,536 B2
(45) Date of Patent: Sep. 13, 2022

(54) EOG-BASED METHOD AND APPARATUS FOR ASYNCHRONOUS CHARACTER INPUT

(71) Applicant: SOUTH CHINA UNIVERSITY OF TECHNOLOGY, Guangzhou (CN)

(72) Inventors: Yuanqing Li, Guangzhou (CN); Shenghong He, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 885 days.

(21) Appl. No.: 16/324,926

(22) PCT Filed: Nov. 9, 2017

(86) PCT No.: PCT/CN2017/110102
§ 371 (c)(1),
(2) Date: Feb. 12, 2019

(87) PCT Pub. No.: WO2018/103495
PCT Pub. Date: Jun. 14, 2018

(65) Prior Publication Data
US 2021/0278894 A1  Sep. 9, 2021

(30) Foreign Application Priority Data

Dec. 8, 2016 (CN) .......................... 201611118744.9

(51) Int. Cl.
*G06F 3/01* (2006.01)
*G06F 3/04886* (2022.01)
(Continued)

(52) U.S. Cl.
CPC .......... *G06F 3/013* (2013.01); *G06F 3/04886* (2013.01); *G06K 9/00536* (2013.01);
(Continued)

(58) Field of Classification Search
CPC .......... G06F 3/013; G06F 3/015; G06F 3/018; G06F 3/0233; G06F 3/0236;
(Continued)

(56) References Cited

U.S. PATENT DOCUMENTS 4,320,768 A * 3/1982 Ledley ..................... A61B 3/02
600/546
4,889,422 A * 12/1989 Pavlidis ................. G16H 15/00
128/898

(Continued)

FOREIGN PATENT DOCUMENTS

| CN | 102129307 | 7/2011 |
| CN | 104010089 | 8/2014 |
| CN | 106681495 | 5/2017 |

OTHER PUBLICATIONS

Gan, YuLong. An Intelligent Spell System Based on EOG. Chinese Master's Thesis, Full-text Database, Information Science and Technology. Mar. 15, 2016, No. 03, ISSN: 1674-0246, pp. 6, 7, 32, 33 and 36-39.

*Primary Examiner* — Ryan A Lubit
(74) *Attorney, Agent, or Firm* — JMB Davis Ben-David (57) ABSTRACT

The present invention discloses an EOG-based method and apparatus for asynchronous character input, said method comprising the following steps: displaying a virtual keyboard having a total of N keys on a display, the virtual keyboard flickering in rounds, wherein in each round, all N keys randomly flicker once; when spelling, a user blinks after the flickering of a target key, so as to acquire electro-oculogram signals of the user in real-time; capturing electro-oculogram data within a time period following the flickering of a key from the acquired electro-oculogram signals, and using said electro-oculogram data as an original feature vector of the flickering key; N original feature vectors being generated in each cycle, an electro-oculogram identification (Continued)

method is called to identify the N original feature vectors, and outputting a certain result from 0 to N, wherein 0 indicates that a condition for character input is not met, and 1 to N correspond to the N keys on the virtual keyboard. The present invention ensures that blinking by a user may be detected normally, while at the same time effectively eliminating misjudgments of non-blinking signals, thus increasing the accuracy rate of character input.

10 Claims, 3 Drawing Sheets

(51) Int. Cl.
*G06N 5/04* (2006.01)
*G06N 20/10* (2019.01)
*G06K 9/00* (2022.01)
*G06K 9/62* (2022.01)

(52) U.S. Cl.
CPC ......... *G06K 9/6256* (2013.01); *G06K 9/6269* (2013.01); *G06N 5/04* (2013.01); *G06N 20/10* (2019.01)

(58) Field of Classification Search
CPC ............ G06F 3/04886; G06K 9/00536; G06K 9/6256; G06K 9/6269; G06N 5/04; G06N 20/10
See application file for complete search history.

(56) References Cited

U.S. PATENT DOCUMENTS

| | | | |
|---|---|---|---|
| 8,405,610 B1 | 3/2013 | Cole | |
| 8,878,782 B1 | 11/2014 | Cole | |
| 9,510,752 B2* | 12/2016 | Klin | A61B 5/163 |
| 2006/0061544 A1* | 3/2006 | Min | G06F 3/015 |
| | | | 345/7 |
| 2008/0154111 A1* | 6/2008 | Wu | A61B 5/296 |
| | | | 600/383 |
| 2011/0289030 A1* | 11/2011 | Lu | A61B 5/378 |
| | | | 706/14 |
| 2016/0078771 A1* | 3/2016 | Zhuang | G09B 5/00 |
| | | | 434/236 |

* cited by examiner

EOG-BASED METHOD AND APPARATUS FOR ASYNCHRONOUS CHARACTER INPUT

CROSS-REFERENCE TO RELATED APPLICATIONS

This is the U.S. National Stage of International Application No. PCT/CN2017/110102 filed Nov. 9, 2017, which was published in Chinese under PCT Article 21(2), and which in turn claims the benefit of China Patent Application No. 201611118744.9 filed Dec. 8, 2016.

FIELD OF THE INVENTION

The present invention belongs to the technical field of character input relying on human biological signals, and particularly relates to an EOG-based method and apparatus for asynchronous character input.

BACKGROUND OF THE INVENTION

In order to enable disabled people with motor dysfunction to interact with the outside world and improve their quality of life and self-care ability, a new type of human-machine interface that uses human bioelectrical signals to communicate with computers or external devices has become the frontiers and hot spots of research in recent years. The human bioelectrical signals mainly include electroencephalogram (EEG), electromyography (EMG), electrocardiogram (ECG), and electrooculogram (EOG) signals. The human-machine interface based on the bioelectrical signals can achieve interaction with the outside world without any significant movement of a user, which is of great significance for disabled people with severe movement disorders (such as amyotrophic lateral sclerosis ALS, brainstem stroke, spinal cord injury SCI, etc.).

In the above bioelectrical signals, the ECG signal is difficult to be controlled by humans, the EMG signal requires the user to have muscle tissue that is both mobile and suitable for use as a control signal, and the EEG signal is complex and weak and more difficult to implement the high-performance human-machine interface. Therefore, a considerable part of the human-machine interface involved in the prior art uses the EOG signal. The EOG signal is a bioelectrical signal generated by movements of the eyeball such as horizontal movement, vertical movement, rotation or blinking.

The Chinese invention patent application with the publication number CN1601445A disclosed "A Multi-Function Human Biological Electro-Oculogram Switch Control Device" on Mar. 30, 2005. This solution used the EOG signals corresponding to a subject's consecutive 3, 4 and 5 blinks as a control command for switching external devices. The control command of this method is single and cannot meet the requirements of complicated human-machine interaction tasks.

The Chinese invention patent application with the publication number CN102129307A disclosed "A Computer Input Control Method Based on Electro-oculogram Signals" on Jul. 20, 2011. In this solution, the rows and columns in the virtual keyboard were highlighted in a cyclic manner, and the electro-oculogram signal was acquired and identified by the electro-oculogram acquisition module. When the electro-oculogram signal was identified, the currently highlighted row and column was determined as the row and column where the target character was. The electro-oculogram identification strategy adopted by this solution was as follows: when the amplitude of the signal was detected to be greater than 120 µV for consecutive 30 ms, the signal was judged to be a blink. Although the method disclosed in this patent does enable complex computer input control, it at least has the following disadvantages: Firstly, in one example disclosed in this patent, the keyboard area consisting of 7 rows and 8 columns was cyclically highlighted in the form of rows and columns, with 1 s for each highlighting. Therefore, theoretically one round of cyclic highlighting cost 15 s. Assuming that every blinking could be successfully detected, the average time required to enter a character was 7.5 s (rows and columns did not need to fully flicker). If a blinking was unsuccessfully detected, the time would increase by at least 7-8 s, so the character input was slower. Secondly, the disclosed method did not control the misjudgments very well. When the device was started but the user did not want to input characters temporarily, it might also cause erroneous input due to involuntary blinking. Finally, the blinking detection strategy of the disclosed method was too simple, only judging the signal within consecutive 30 ms according to the threshold. This judgment condition was too broad, because other movements of the eyeball such as horizontal glance, squint, rotation and jump were also very easy to generate an electro-oculogram wave of more than 120 µV and misjudged as blinking, which in turn caused erroneous input. In fact, however, these electro-oculogram activities are significantly different from blinking in the waveform.

Therefore, it is important to provide a method and apparatus for accurately inputting characters based on an electro-oculogram signal.

SUMMARY OF THE INVENTION

The main object of the present invention is to overcome the defects and shortcomings of the prior art and provide an EOG-based method for asynchronous character input, which ensures that blinking by a user may be detected normally, while at the same time effectively eliminating misjudgments of non-blinking signals, thus increasing the accuracy rate of character input.

Another object of the present invention is to provide an EOG-based apparatus for asynchronous character input, which can ensure that blinking by a user may be detected normally, while at the same time effectively eliminating misjudgments of non-blinking signals, thus increasing the accuracy rate of character input.

The objects of the present invention are achieved by the following technical solution: An EOG-based method for asynchronous character input is provided, comprising the following steps:

displaying a virtual keyboard assumed to have a total of N keys on a display, the virtual keyboard flickering in rounds, wherein in each round, all N keys randomly flicker once; when spelling, a user blinks after the flickering of a target key, so that an electro-oculogram acquisition module acquires electro-oculogram signals of the user in real-time; capturing electro-oculogram data within a time period following the flickering of a key from the acquired electro-oculogram signals, and using said electro-oculogram data as an original feature vector of the flickering key; N original feature vectors being generated in each cycle, an electro-oculogram identification method is called to identify the N acquired original feature vectors, and an electro-oculogram identification algorithm will output a certain result from 0 to N, wherein 0 indicates that a condition for character input is not met, and 1 to N correspond to the N keys on the virtual keyboard.

Specific steps are as follows:

S1: the virtual keyboard flickers in rounds, wherein in each round, all N keys randomly flicker once; when spelling, a user blinks after the flickering of a target key, so that an electro-oculogram acquisition module acquires electro-oculogram signals of the user in real-time; electro-oculogram data are captured within a time period of 100-500 ms following the flickering of a key from the acquired electro-oculogram signals, and used as an original feature of this key in this round of flickering;

S2: the captured original feature data are pre-processed in sequence including removing baseline drift, removing 50 Hz power frequency interference, and 0.1-30 Hz bandpass filtering;

S3: a first-order difference of the electro-oculogram datum x after the pre-processing in the step S2 is found, which is performed specifically by the following method:

$$d_i = x_{i+1} - x_i$$

where i denotes an i-th sampling point and d denotes a differential signal;

S4: N features of $D=[d_1, d_2, \ldots, d_N]$ after the difference correspond to N key flickerings in one round; SVM classification and waveform detection are performed to obtain N SVM classification results of $S=[s_1, s_2, \ldots, s_i, \ldots, s_N]$ and N waveform detection results of $W=[w_1, w_2, \ldots, w_i, \ldots, w_N]$, wherein only the first largest M scores are retained for the SVM classification result S with the rest set to zero; the SVM classification result S and the waveform detection result W are multiplied to obtain $R^t$, where t denotes the t-th round:

$$R^t = [r_1^t, r_2^t, \ldots, r_i^t, \ldots, r_N^t] = [s_1 \cdot w_1, s_2 \cdot w_2, \ldots, s_i \cdot w_i, \ldots, s_N \cdot w_N]$$

and $R^t$ is an N-dimensional row vector containing M non-zero values;

S5: $R^t$ is traversed, and if $r_i^t > 0$ does not exist, there is no target output in the current round, and the process returns to the step S1 to continue the detection; if $r_i^t > 0$ exists, the key that satisfies $r_i^t > 0$ is regarded as the candidate target of the current round for further judgment; and S6: in three consecutive detections (t-th, t-1-th and t-2-th detections), if no key is detected to be a candidate target twice, then there is no target output in the current round, the output result is 0, and the process returns to the step S1 to continue the detection; otherwise, a key corresponding to the maximum $r_i^t + r_i^{t-1} + r_i^{t-3}$ is determined as the target, and its corresponding operation is performed according to the key, and then the process proceeds to the step S1 to continue the detection.

Preferably, the virtual keyboard has a total of 40 keys in 4 rows and 10 columns.

Specifically, all the keys flicker in a "conditional random" manner that is specifically as follows: with a round taking 1.2 s, each of the 40 keys will flicker once in a round for a duration of 100 ms at an interval of 30 ms between two adjacent flickering keys.

Further, the "conditional random" flickering manner means that the flickering order of 40 keys is random in each round, but the following two conditions need to be met:

(1-1) any key flickers at an interval of not being less than 600 ms in two consecutive rounds; and (1-2) when the flickering order of the keys in one round is determined, it is necessary to determine the flickering order of the keys in the previous two rounds, that is, trying to ensure that characters appeared around any character in the previous two rounds do not again appear around this character in the current round.

Preferably, the waveform detection in the step S4 comprises the following steps:

The following three conditions are detected for a differential signal $D_i$: a. a trough appears 40-140 ms after the appearance of a peak; b. the peak/trough corresponds to the maximum/minimum point of the entire segment of the signal; and c. the sum of the energy of the signal from the peak to the trough is greater than a preset threshold P.

When all the three conditions are fulfilled in the detection, the waveform of the key i corresponding to the differential signal $D_i$ passes the detection; with $w_1$ taking a value of 0 or 1, $w_i=0$ indicates that the waveform of the feature $d_i$ does not pass the detection, and $w_1=1$ indicates that the waveform of the feature $d_i$ passes the detection.

Preferably, the SVM classifier used in the step S4 needs to be trained in advance, and the training process comprises the following steps:

(4-1) The electro-oculogram data are acquired from several trials, wherein each of the trials has a specified target key and is carried out for several rounds, and the N keys randomly flicker once in each round, requiring that a user blinks only when the target key flickers, so that each key generates one feature vector in each round in each trial, and all the feature vectors contain positive and negative samples required to train the SVM classifier;

(4-2) among all the acquired feature vectors, the features corresponding to the target key are regarded as positive sample features and given a label 1, and the features corresponding to the non-target key are regarded as negative sample features and given a label−1; and (4-3) the SVM classifier is trained with these labeled positive and negative samples.

Preferably, when the virtual keyboard has 40 keys, M takes a value of 5 in the step S4.

An EOG-based apparatus for asynchronous character is provided, comprising an electrode, an electro-oculogram acquisition module, a computer host and a display; the electrode is connected to the electro-oculogram acquisition module through a self-contained connecting wire, an electro-oculogram signal obtained by the electro-oculogram acquisition module is transmitted to the computer host through a common serial port, and the computer host is connected to the display through a common VGA cable.

Preferably, the electrode is a common silver chloride electrode.

Preferably, the electro-oculogram acquisition module comprises a signal amplification module, a signal filtering module, an A/D conversion module, and a serial communication module, wherein:

(1) the signal amplification module is based on an INA128 chip, having a common mode rejection ratio of 120 db or more and an amplification factor of 1000 times or more;

(2) the signal filtering module is based on an OPA4227 chip, comprising a second-order Butterworth high-pass filter with a cutoff frequency of 3 Hz, a fourth-order Butterworth low-pass filter with a cutoff frequency of 25 Hz, and a Butterworth 50 Hz trap filter.

(3) the A/D conversion module is based on an AD7606 chip, having a conversion accuracy of 16 bits; and (4) the serial communication module adopts a serial communication module that comes with STM32.

Compared with the prior art, the present invention has the following advantages and benefits:

(1) In the blinking detection, the present invention combines the two methods of waveform matching and SVM classification, and substantially eliminates misjudgments of non-blinking signals while ensuring that blinking is normally detected.

(2) The present invention strictly uses the flickering timing of the keys as the moment when the user blinks. On the one hand, the accuracy of the blinking detection is increased; and on the other hand, a physiologically indistinct blinking motion can be corresponding to 40 different key operations. In turn, the EOG virtual keyboard of up to 40 different keys disclosed in the present invention is realized, and the character input is faster.

(3) The "conditional random flicker" extracted by the present invention can well solve the misjudgment of non-target keys with close timing.

(4) The present invention adopts a mechanism that being detected 2 times in 3 rounds is considered as target input, which not only helps to reduce the misjudgments caused by the non-autonomous blink, but also reduces the misjudgments of the autonomous blinking as other keys.

DETAILED DESCRIPTION OF THE EMBODIMENTS

The present invention will be further described in detail below with reference to examples and drawings, but the embodiments of the present invention are not limited thereto.

Figure 1:
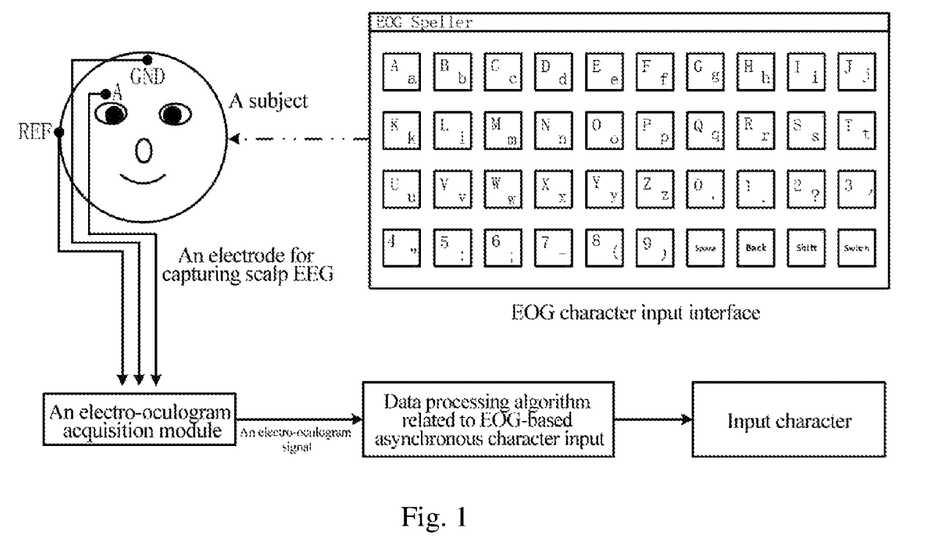
FIG. 1 is a schematic view showing the arrangement of electrodes in this example.
Figure 2:
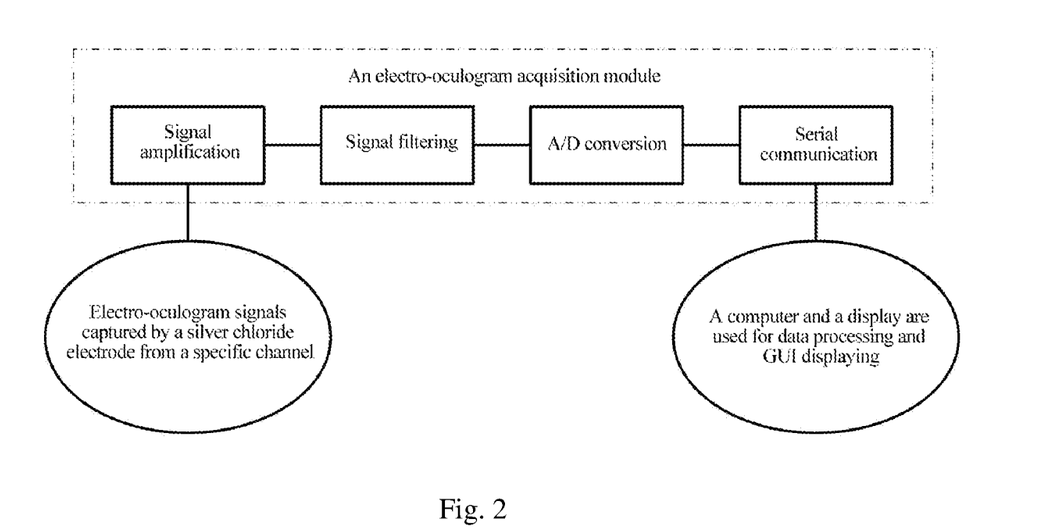
FIG. 2 is a block diagram of an electro-oculogram acquisition module in this example.

Referring to FIGS. 1 and 2, an EOG-based apparatus for asynchronous character input of this example is provided, comprising an electrode, an electro-oculogram acquisition module, a computer host and a display. The electrode is connected to the electro-oculogram acquisition module through a self-contained connecting wire, an electro-oculogram signal obtained by the electro-oculogram acquisition module is transmitted to the computer host through a common serial port, and the computer host is connected to the display through a common VGA cable.

The electrode is a common silver chloride electrode. As shown in FIG. 1, this example includes three electrodes (GND: ground; E: electrooculogram; REF: reference) for acquiring the electro-oculogram signals of a subject.

The electro-oculogram acquisition module uses a sampling rate of 250 Hz when acquiring electrooculogram. As shown in FIG. 2, the electro-oculogram acquisition module comprises four sub-modules: signal amplification, signal filtering, A/D conversion, and serial communication. The characteristics of each sub-module are as follows:

(1) The signal amplification module is mainly based on the INA128 chip design, having a common mode rejection ratio of 120 db or more and an amplification factor of 1000 times or more;

(2) the signal filtering module is mainly based on the OPA4227 chip design, comprising a second-order Butterworth high-pass filter with a cutoff frequency of 3 Hz, a fourth-order Butterworth low-pass filter with a cutoff frequency of 25 Hz, and a Butterworth 50 Hz trap filter;

(3) the A/D conversion module is mainly based on the AD7606 chip design, having a conversion accuracy of 16 bits; and (4) the serial communication module is implemented mainly based on a serial communication module that comes with STM32.

In this example, the computer host is a normal PC (desktop or laptop), and the operating system is Windows XP or Windows 7. The display is a normal liquid crystal display.

Figure 3:
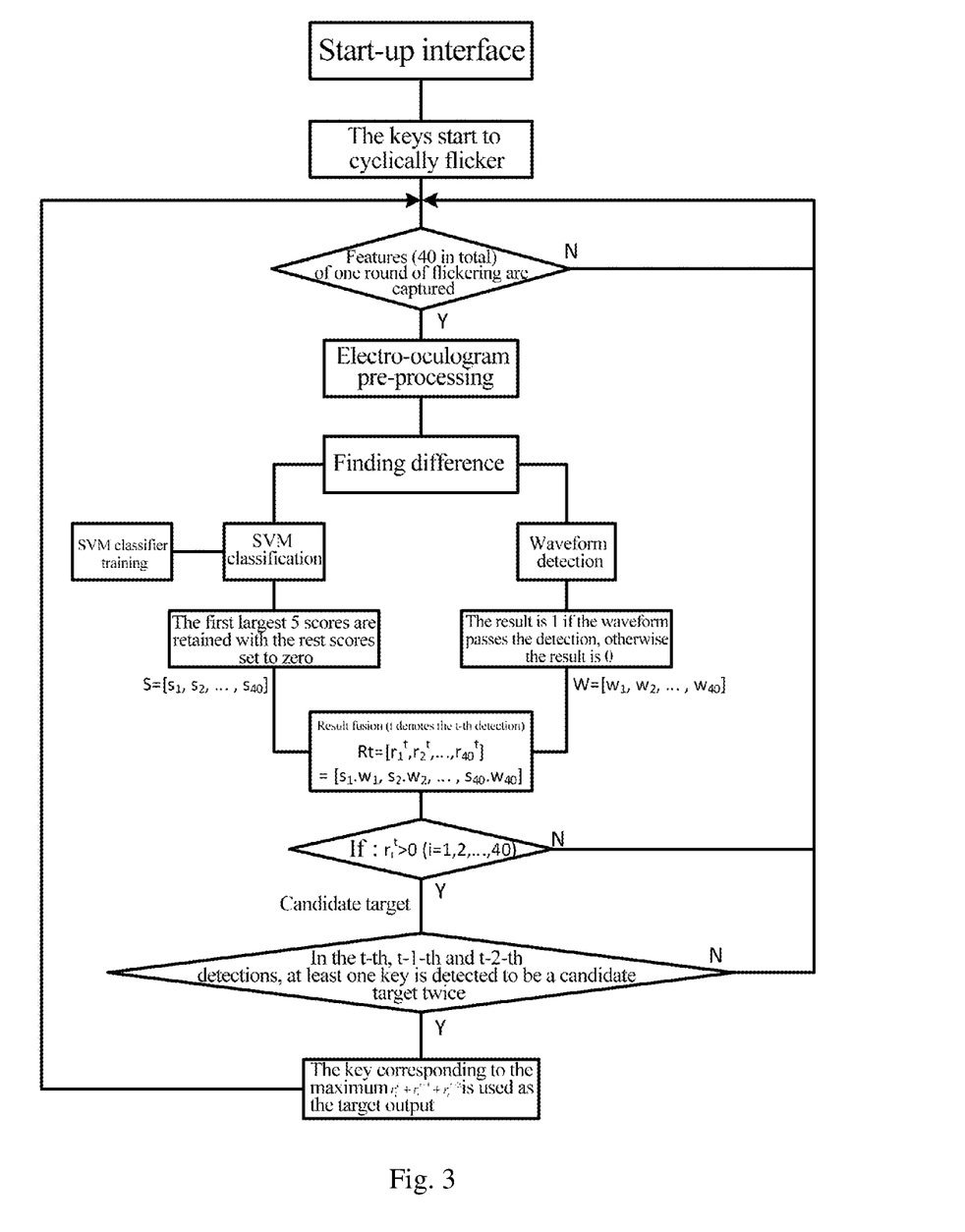
FIG. 3 is a flow chart of the EOG-based method for asynchronous character input in this example.
Figure 4:
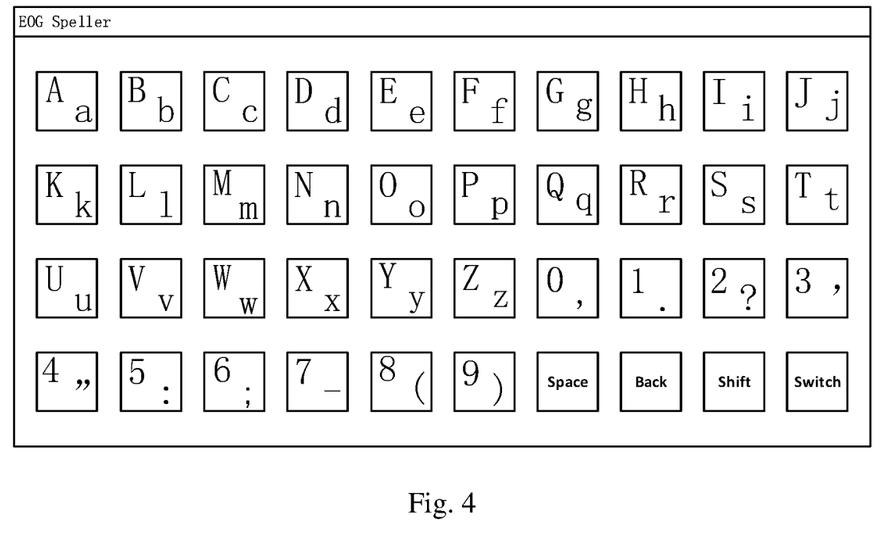
FIG. 4 is a schematic diagram of a virtual keyboard in this example.

The EOG-based method for asynchronous character input based on the above apparatus of this example, as shown in FIG. 3, comprises the following steps:

S1: Displaying a virtual keyboard having a total of 40 keys in 4 rows and 10 columns on a display, as shown in FIG. 4.

All the keys of the virtual keyboard flicker in a "conditional random" manner. The specific flickering method is 1.2 s for one round, and each of the 40 keys will flicker once in one round; each key flickers for a duration of 100 ms, and the interval between two adjacent flickering keys is 30 MS.

The "conditional random" flickering manner means that the flickering order of 40 keys is random in each round, but the following two conditions need to be met:

(1) Any key flickers at an interval of not being less than 600 ms in two consecutive rounds.

(2) When the flickering order of the keys in one round is determined, it is necessary to consider the flickering order of the keys in the previous two rounds, that is, trying to ensure that characters appeared around any character in the previous two rounds do not again appear around this character. Assuming that the three keys that appear before and after the key 10 in the i-th round form an set A{1, 2, 3, 5, 12, 6}, and the three keys that appear before and after the key 10 in the i+1-th round form a set B{4, 14, 8, 30, 36, 11}, when the flickering order of the i+2-th round is determined, the three flickering keys before and after the key 10 cannot belong to the set A or the set B.

S2: The virtual keyboard flickers in rounds in the manner of the step S1, and when spelling, the user is required to blink following the flickering of the target key; the electro-oculogram data within 100-500 ms following the flickering of a key are captured from the electro-oculogram signal acquired by the electro-oculogram acquisition module, and used as the original feature of the flickering key; with each round corresponding to 40 original feature vectors, an electro-oculogram identification algorithm is called to identify the 40 acquired original feature vectors, and will output a certain result from 0 to 40, wherein 0 indicates that a condition for character input is not met, and 1 to 40 correspond to the 40 keys on the interface of the step 2.

The detailed process of this step comprises the following steps:

S2-1: The electro-oculogram data within 100-500 ms following the flickering of each key is captured as an original feature.

Note that the time interval between the two flickering keys in the step S1 is 30 ms, so the original features of the keys will have data overlap, but such overlap does not affect the implementation of the present invention.

S2: The acquired original feature data with a duration of 400 ms are pre-processed in sequence including removing baseline drift, removing 50 Hz power frequency interference, and 0.1-30 Hz bandpass filtering.

S3: A first-order difference of the electro-oculogram datum x after the pre-processing in the step S2-2 is found, which is performed specifically by the following method:

$$d_i = x_{i+1} - x_i$$

Where i denotes the i-th sampling point (the sampling frequency is 250 Hz, and the feature of 400 ms contains a total of 100 sampling points), and d denotes the signal after the difference.

S2-4: Forty features of $D=[d_1, d_2, \ldots, d_{40}]$ after the difference correspond to 40 key flickerings in a round, and SVM classification and waveform detection are performed to obtain 40 SVM classification results of $S=[s_1, s_2, \ldots, s_i, \ldots, s_{40}]$ and 40 waveform detection results of $W=[w_1, w_2, \ldots, w_i, \ldots, w_{40}]$, wherein only the first largest 5 scores are retained for S with the rest set to zero. The SVM classification result S and the waveform detection result W are multiplied to obtain $R^t$.

$$R^t = [r_1^t, r_2^t, \ldots, r_{40}^t] = [s_1 \cdot w_1, s_2 \cdot w_2, \ldots, s_{40} \cdot w_{40}].$$

S2-5: $R^t$ is traversed, and if $r_i^t > 0$ does not exist, there is no target output in the current round, and the process returns to the step S2-1 to continue the detection; if $r_i^t > 0$ exists, the key that satisfies $r_i^t > 0$ is regarded as the candidate target of the current round for further judgment.

S2-6: In three consecutive detections (t-th, t-1-th and t-2-th detections), if no key is detected to be a candidate target twice, then there is no target output in the current round, the output result is 0, and the process returns to the step S2-1 to continue the detection; otherwise, the key corresponding to the maximum $r_i^t + r_i^{t-1} + r_i^{t-2}$ is determined as the target, and its corresponding operation is performed, such as outputting the corresponding character, deleting the character, case switching, and keyboard locking, and then the process proceeds to the step S2-1 to continue the detection.

For example, if the keys 1, 2, 3 are candidates in the t-1-th round, and the keys 2, 3, 4 are candidates in the t-th round, the keys 2, 3 satisfy the condition and are then calculated; since there must be no key 2 or 3 as the candidate in the t-2-th round (otherwise, 2 or 3 should be output in the t-1-th round), the sum of the r values of the keys 2, 3 in the t-2-th, t-1-th and t-th rounds is calculated so as to select the largest as the target. Note that the r value of the t-2-th round is actually 0, because there is no 2 or 3 in the candidates of the t-2-th round.

The waveform detection in the step S2-4 refers to the detection of the following three conditions for the differential signal $D_i$: (1) A trough appears 40-140 ms after the appearance of a peak; (2) the peak/trough does correspond to the maximum/minimum point of the entire segment of the signal; and (3) the sum of the energy of the signal from the peak to the trough is greater than a preset threshold P. When all the three conditions are fulfilled in the detection, the waveform of the key i corresponding to the differential signal $D_i$ passes the detection. With $w_i$ taking a value of 0 or 1, $w_i=0$ indicates that the waveform of the feature $d_i$ does not pass the detection, and $w_i=1$ indicates that the waveform of the feature $d_i$ passes the detection.

The SVM classifier used in the step S2-4 needs to be trained in advance, and the training process comprises the following steps: (1) The electro-oculogram data are acquired from 20 trials according to the steps S2-1, S2-2 and S2-3, wherein each of the trials has a specified target key and includes 10 rounds, and the 40 keys randomly flicker once in each round, requiring that a user blinks only when the target key flickers, so that the acquired data contain positive and negative samples required to train the SVM classifier; (2) in all the acquired 8000 (20 trials×10 rounds×40 keys) feature vectors, the features corresponding to the target key are regarded as positive sample features (200 in total) and given a label 1, and the features corresponding to the non-target key are regarded as negative sample features (7800 in total) and given a label −1; and (3) the SVM classifier is trained with these labeled positive and negative samples.

Because the blinking waveform is relatively stable, and the discrimination between the two types (a blinking signal and a non-blinking signal) is relatively large, a trained SVM classifier has been tested and can be used by different users for a long time; if it is not effective for some users, a specific SVM classifier can be retrained in a targeted manner.

The above-described examples are preferred embodiments of the present invention, but the embodiments of the present invention are not limited thereto, and any other alterations, modifications, substitutions, combinations and simplifications should be equivalent replacements and included in the scope of protection of the present invention.

The invention claimed is:

1. An EOG-based method for asynchronous character input, characterized in that: the method comprises the following steps:

displaying a virtual keyboard having a total of N keys on a display, the virtual keyboard flickering in rounds, wherein in each round, all N keys randomly flicker once; when spelling, a user blinks after the flickering of a target key, so that an electro-oculogram acquisition module acquires electro-oculogram signals of the user in real-time; capturing electro-oculogram data within a time period following the flickering of a key from the acquired electro-oculogram signals, and using said electro-oculogram data as an original feature vector of the flickering key; N original feature vectors being generated in each cycle, an electro-oculogram identification algorithm is called to identify the N acquired original feature vectors, and the electro-oculogram identification algorithm will output a certain result from 0 to N, wherein 0 indicates that a condition for character input is not met, and 1 to N correspond to the N keys on the virtual keyboard.

2. The EOG-based method for asynchronous character input according to claim 1, characterized in that: the method comprises the following steps:

S1: the virtual keyboard flickers in rounds, wherein in each round, all N keys randomly flicker once; when spelling, a user is required to blink after the flickering of a target key, so that the electro-oculogram acquisition module acquires electro-oculogram signals of the user in real-time; electro-oculogram data are captured within a time period of 100-500 ms following the flickering of a key from the acquired electro-oculogram signals, and used as the original feature vector of this key in this round of flickering;

S2: the captured original feature data are pre-processed in sequence including removing baseline drift, removing 50 Hz power frequency interference, and 0.1-30 Hz bandpass filtering;

S3: a first-order difference of the electro-oculogram datum x after the pre-processing in the step S2 is found, which is performed specifically by the $$d_i = x_{i+1} - x_i$$

where i denotes an i-th sampling point and d denotes a differential signal;

S4: N features of $D=[d_1, d_2, \ldots, d_N]$ after the difference correspond to N key flickerings in one round; SVM classification and waveform detection are performed to obtain N SVM classification results of $S=[s_1, s_2, \ldots, s_i, \ldots, s_N]$ and N waveform detection results of $W=[W_1, W_2, \ldots, W_i, \ldots, W_N]$, wherein only the first largest M scores are retained for the SVM classification result S with the rest set to zero; the SVM classification result S and the waveform detection result W are multiplied to obtain $R^t$, where t denotes the t-th round:

$$R^t=[r_1^t, r_2^t, \ldots, r_i^t, \ldots, r_N^t]=[s_1 \cdot w_1, s_2 \cdot w_2, \ldots, s_i \cdot w_i, \ldots, s_N \cdot w_N]$$

and $R^t$ is an N-dimensional row vector containing M non-zero values;

S5: $R^t$ is traversed, and if $r_i^t>0$ does not exist, there is no target output in the current round, and the process returns to the step S1 to continue the detection; if $r_i^t>0$ exists, the key that satisfies $r_i^t>0$ is regarded as the candidate target of the current round for further judgment; and S6: in three consecutive detections (t-th, 1-th and t-2-th detections), if no key is detected to be a candidate target twice, then there is no target output in the current round, the output result is 0, and the process returns to the step S1 to continue the detection; otherwise, a key corresponding to the maximum $r_i^t+r_i^{t-1}+r_i^{t-3}$ is determined as the target, and its corresponding operation is performed according to the key, and then the process proceeds to the step S1 to continue the detection.

3. The EOG-based method for asynchronous character input according to claim 2, characterized in that: the virtual keyboard has a total of 40 keys in 4 rows and 10 columns, and all the keys flicker in a "conditional random" manner that is specifically as follows: with a round taking 1.2 s, each of the 40 keys will flicker once in a round for a duration of 100 ms at an interval of 30 ms between two adjacent flickering keys.

4. The EOG-based method for asynchronous character input according to claim 3, characterized in that: the "conditional random" flickering manner means that the flickering order of 40 keys is random in each round, but the following two conditions need to be met:

(1-1) any key flickers at an interval of not being less than 600 ms in two consecutive rounds; and (1-2) when the flickering order of the keys in one round is determined, it is necessary to determine the flickering order of the keys in the previous two rounds, that is, trying to ensure that characters appeared around any character in the previous two rounds do not again appear around this character in the current round.

5. The EOG-based method for asynchronous character input according to claim 2, characterized in that: the waveform detection in the step S4 comprises the following steps:

the following three conditions are detected for a differential signal $D_i$: a. a trough appears 40-140 ms after the appearance of a peak; b. the peak/trough corresponds to the maximum/minimum point of the entire segment of the signal; and c. the sum of the energy of the signal from the peak to the trough is greater than a preset threshold P;

when all the three conditions are fulfilled in the detection, the waveform of the key i corresponding to the differential signal $D_i$ passes the detection; with Iv, taking a value of 0 or 1, $w_i=0$ indicates that the waveform of the feature $d_i$ does not pass the detection, and $w_i=1$ indicates that the waveform of the feature $d_i$ passes the detection.

6. The EOG-based method for asynchronous character input according to claim 2, characterized in that: the SVM classifier used in the step S4 needs to be trained in advance, and the training process comprises the following steps:

(4-1) the electro-oculogram data are acquired from several trials, wherein each of the trials has a specified target key and is carried out for several rounds, and the N keys randomly flicker once in each round, requiring that a user blinks only when the target key flickers, so that each key generates a feature vector in each round in each trial, and all the feature vectors contain positive and negative samples required to train the SVM classifier;

(4-2) among all the acquired feature vectors, the features corresponding to the target key are regarded as positive sample features and given a label 1, and the features corresponding to the non-target key are regarded asnegative sample features and given a label −1; and (4-3) the SVM classifier is trained with these labeled positive and negative samples.

7. The EOG-based method for asynchronous character input according to claim 2, characterized in that: when the virtual keyboard has 40 keys, M takes a value of 5 in the step S4.

8. An input apparatus characterized in that: this apparatus comprises an electrode, an electro-oculogram acquisition module, a computer host and a display; the electrode is connected to the electro-oculogram acquisition module through a self-contained connecting wire, an electro-oculogram signal obtained by the electro-oculogram acquisition module is transmitted to the computer host through a common serial port, and the computer host is connected to the display through a common VGA cable;

wherein the display is configured to display a virtual keyboard having a total of N keys on the display, the virtual keyboard is configured to flicker in rounds, and all N keys are configured to flicker randomly once in each round;

wherein the electro-oculogram acquisition module is configured to acquire electro-oculogram signals of a user in real-time through the electrode when the user blinks after the flickering of a target key when spelling, capture electro-oculogram data within a time period following the flickering of a key from the acquired electro-oculogram signals, use said electro-oculogram data as an original feature vector of the flickering key, and generate N original feature vectors in each cycle; and wherein the computer host is configured to identify the N acquired original feature vectors and output a certain result from 0 to N through an electro-oculogram identification algorithm, wherein 0 indicates that a condition for character input is not met, and 1 to N correspond to the N keys on the virtual keyboard.

9. The input apparatus according to claim 8, characterized in that: the electro-oculogram acquisition module comprises a signal amplification module, a signal filtering module, an A/D conversion module, and a serial communication module, wherein:

(1) the signal amplification module is based on an INA128 chip, having a common mode rejection ratio of 120 db or more and an amplification factor of 1000 times or more;

(2) the signal filtering module is based on an OPA4227 chip, comprising a second-order Butterworth high-pass filter with a cutoff frequency of 3 Hz, a fourth-order Butterworth low-pass filter with a cutoff frequency of 25 Hz, and a Butterworth 50 Hz trap filter;

(3) the A/D conversion module is based on an AD7606 chip, having a conversion accuracy of 16 bits; and (4) the serial communication module adopts a serial communication module that comes with STM32.

10. The input apparatus according to claim 8, characterized in that: the electrode is a common silver chloride electrode.

\* \* \* \* \*